United States Patent Office 2,967,861
Patented Jan. 10, 1961

2,967,861
NAPHTHALIMIDO-TRIAZINO-ANTHRAQUINONE

William L. Mosby, North Plainfield, and William L. Berry, Neshanic, N.J., assignors to American Cyanamid Company, New York, N.Y., a corporation of Maine No Drawing. Filed Oct. 12, 1959, Ser. No. 845,612

1 Claim. (Cl. 260—249)

This invention relates to a new anthraquinone dye and pigment. More specifically, this invention relates to a new compound of the formula

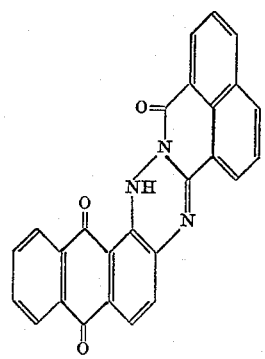

which compound is a new blue vat dye and vat pigment.

The compound of our invention is prepared by the reaction of 1-chloro-2-nitroanthraquinone with N-aminonaphthalimide. The intermediate N-(2-nitro-1-anthraquinonylamino) naphthalimide of the formula

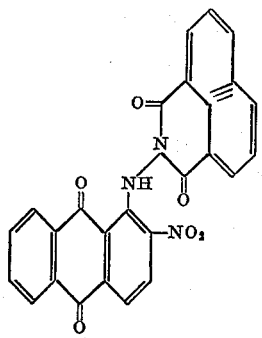

upon reduction of the nitro group with sodium sulfide or alternatively by vatting with sodium hydrosulfite and caustic, ring closes to give the compound of our invention with the elimination of water.

The product of our invention is a deep blue solid which dyes cotton a blue shade from a yellow-brown vat. It is also usable as a blue pigment for resins or for hydrocarbons such as gasoline.

Our invention can be illustrated by the following examples in which parts are by weight unless otherwise specified.

Example 1

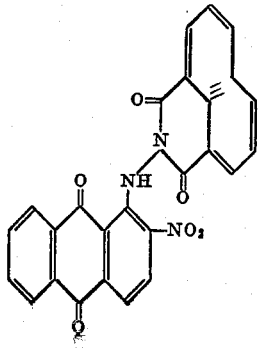

A slurry of 15 parts of 1-chloro-2-nitroanthraquinone, 12.5 parts of N-amino naphthalimide, 4.1 parts of sodium acetate, 1 part of cuprous chloride and 750 parts by volume of amyl alcohol is stirred at reflux until the reaction is substantially complete. The mixture is then cooled and filtered. The solid product can be recrystallized from chlorobenzene.

Example 2

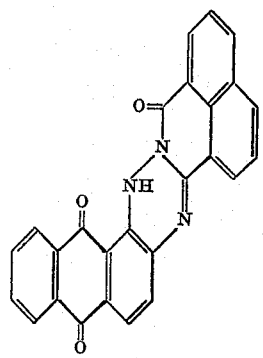

To a solution of 20 parts of sodium sulfide nonahydrate in 400 parts by volume of pyridine and 600 parts by volume of water is added 10 parts of the product of Example 1. The mixture is held at reflux until the reduction is substantially complete. The cooled mixture is filtered to yield the blue product of the above formula. It may be purified by dissolving in concentrated sulfuric acid and precipitating by dilution with a small amount of water.

Example 3

A colored plasticized polyvinyl chloride is prepared by milling 100 parts of polyvinylchloride, 50 parts of di-2-ethylhexylphthalate, 2 parts of barium cadmium laurate, 1 part of a triarylphosphite and 5 parts of the product of Example 2. The milled mixture is molded in a standard way. A sheet of blue plasticized polyvinylchloride is obtained.

We claim:

The compound of the formula

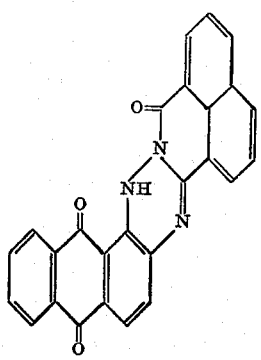

References Cited in the file of this patent

Lubs: The Chemistry of Synthetic Dyes and Pigments, p. 530, Reinhold Publishing Corp. (1955).

Erickson et al.: The 1,2,3- and 1,2,4 Triazines, Tetrazines and Pentazines [Vol. 10 of The Chemistry of Heterocyclic Compounds], Chapter II, pp. 113–123, Interscience Publishers, Inc., N.Y., N.Y. (1956).